Patented Feb. 15, 1944

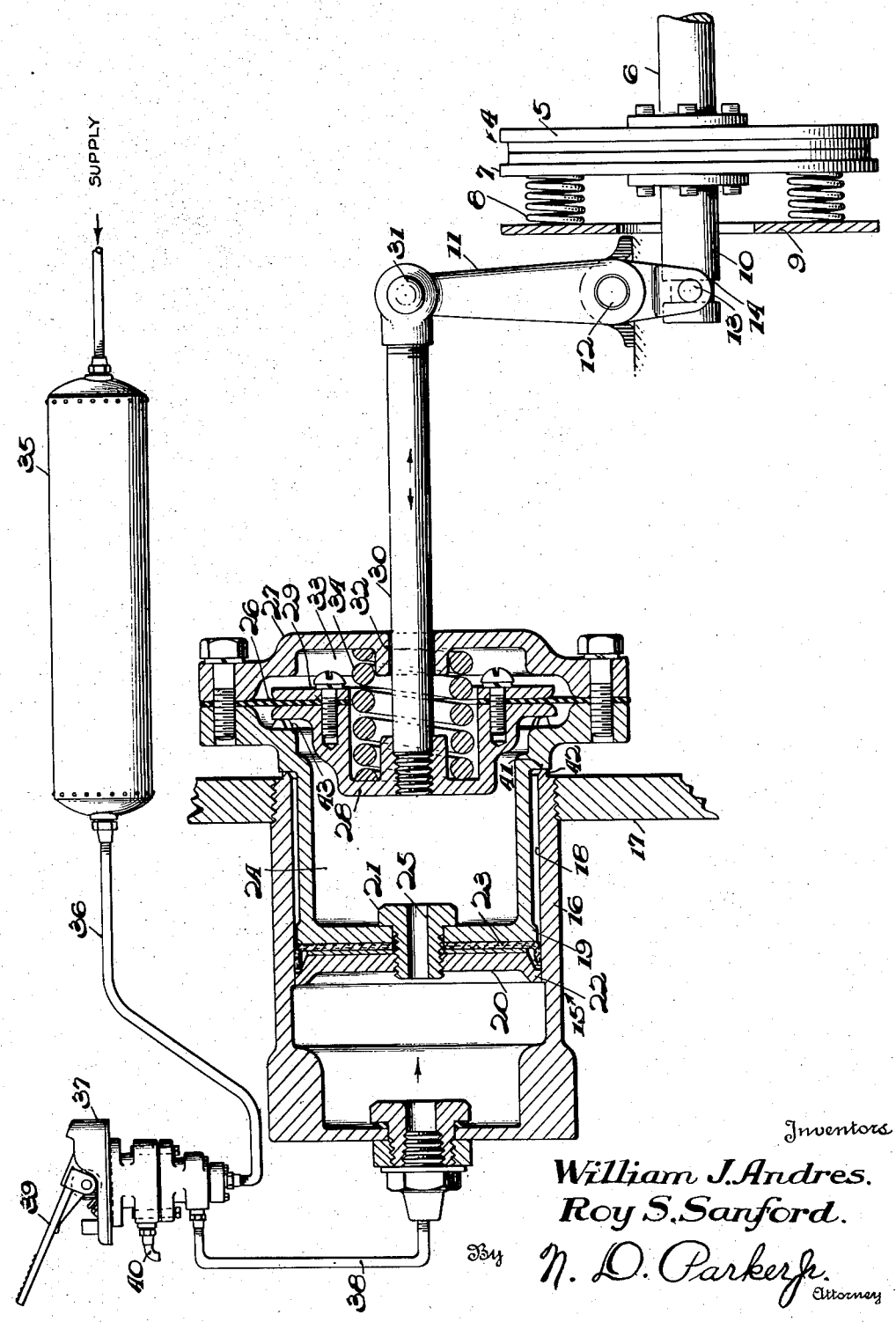

2,341,587

UNITED STATES PATENT OFFICE 2,341,587

FLUID PRESSURE DEVICE

William J. Andres, Morris, N. Y., and Roy S. Sanford, Waterbury, Conn., assignors to Bendix-Westinghouse Automotive Air Brake Company, Elyria, Ohio, a corporation of Delaware Application October 9, 1941, Serial No. 414,353

11 Claims. (Cl. 121—38)

This invention relates to fluid pressure controlling apparatus and more particularly to a mechanism for remotely controlling the actuation of a vehicle clutch.

Various types of constructions have heretofore been proposed for remotely controlling the engagement and disengagement of a vehicle clutch, for example, such devices in many cases constituting a fluid motor having a cylinder and a piston, with the piston connected with the clutch throwout lever in such a manner that variations in fluid pressure in the cylinder serve to control engagement and disengagement of the clutch plates. Among the problems presented by previous installations of this type, however, has been that of erratic operation of the clutch lever due to the inherent friction between the packing used on the piston and the wall of the cylinder, this undesirable friction tending to prevent the actuation of the clutch throwout lever from directly following changes in pressure in the cylinder in response to operation of the control valve therefor.

It is accordingly an object of the present invention to provide a fluid motor so constituted as to overcome these disadvantages.

Another object of the invention is to provide a fluid motor for the remote control of devices to be actuated, so constituted as to provide smooth and uniform actuation of the devices under all conditions.

A further object of the invention is to provide, in connection with a fluid motor of the type above referred to, an arrangement for rendering the motor unusually efficient during one particular portion of the operating range thereof.

Yet another object of the invention is to provide, in a fluid motor, a piston construction so constituted as to substantially minimize the detrimental effects of the friction inherent between the piston and the cylinder wall.

These and other objects and novel features of the invention will appear more fully hereinafter from the following detailed description when taken in connection with the accompanying drawing, illustrating one form of the invention. It is to be expressly understood, however, that the drawing is employed for purpose of illustration only and is not designed as a definition of the limits of the invention, reference being had for this latter purpose to the appended claims.

Referring to the drawing, the single figure therein illustrates the present invention in diagrammatic form, certain parts being shown in section. More particularly, the invention is illustrated in connection with a friction clutch 4, of the type commonly used on motor vehicles, a driving plate 5 being driven by the vehicle engine, not shown, through the medium of a crankshaft 6, connected thereto, and serving through its frictional engagement therewith to drive a driven plate 7, normally maintained in engagement with the plate 5 by means of spiral springs 8 interposed between the driven plate and a portion of the engine housing 9. A shaft 10, attached to the driven plate, serves to drive the wheels of the vehicle through any suitable connecting means, not shown, this shaft being slidably mounted and adapted to be moved axially in one direction or the other by means of a clutch actuating lever 11 pivotally mounted on the vehicle frame by means of a pivot pin 12 and having a pin 13 adapted to engage a groove 14 formed on the shaft 10. It will be readily understood that with the construction described, clockwise rotation of the lever 11 about the pivot pin 12 will tend to move the shaft 10 to the left with corresponding movement of the plate 7 to the left against the force exerted by the springs 8, this action serving to disengage the clutch in the well known manner.

Actuation of the clutch lever 11 is effected through the medium of a fluid motor 15, having a cylinder portion 16 threadedly received by a bracket 17 suitably mounted on the frame of the vehicle, the cylinder being provided with a bore 18 and a piston member 19 slidably mounted therein. A piston guide 20 clamped to the piston by means of a suitable screw 21 is provided with an outer periphery 22 adapted to engage the wall of the cylinder for guiding the piston, a packing cup 23 being clamped between the guide member and the piston in sealing engagement with the wall of the cylinder. As shown, the piston is formed with a hollow chamber 24 therein, the left end of the chamber communicating with the interior of the cylinder, through the medium of a port 25 provided in the screw 21, and the right end of the bore being closed by means of a pressure responsive diaphragm 26 clamped at its outer edge between the right end of the piston body and a cover plate 27 screwed thereto, and clamped at its center to a member 28 by means of a clamping plate 29 screwed thereto. An operating connection between the member 28 and the upper end of the lever 11 is accomplished by means of a connecting rod 30 threadedly received at its left end in the member 28 and pivotally connected at its right end with the lever 11 by means of a pivot pin 31. A bore 32 is provided in the plate 27, this bore being slightly larger than the diameter of the rod 30 in order to permit free communication between chamber 33 formed between the diaphragm and the plate 27 and atmosphere. A relatively heavy spring 34, preferably preloaded, is also interposed between the plate 27 and the member 28 for purposes hereinafter to be described.

As illustrated, the cylinder of the fluid motor 15 is adapted to receive fluid under pressure from a reservoir 35, through the medium of a conduit 36, an operator's control valve 37 and a conduit 38 having a connection with the interior of the cylinder. The control valve 37 is preferably of the well-known self-lapping type and may be constructed as disclosed in Fig. 1 of the patent to William J. Andres and Roy S. Sanford, No. 2,133,275, issued October 18, 1938. For the purposes of this description, it will be understood that depression of the pedal 39 of the brake valve 37 serves to actuate the valve mechanism to establish a connection between conduits 36 and 38, while release of the pedal actuates the valve mechanism to establish a connection between conduit 38 and an exhaust port 40 provided on the control valve. It will thus be understood that the operator may at all times control the actual pressure in the interior of the fluid motor 15.

In previous clutch control mechanisms, the piston has in some cases been directly connected with the clutch actuating lever, with the result that the inherent friction between the piston packing 23 and the wall of the cylinder has prevented a given change of pressure in the cylinder from resulting in a corresponding change in position of the clutch operating lever 11, and consequently of the force holding the clutch plates in engagement. The resultant erratic control of the pressure exerted on the clutch plates, and consequently of the degree of slip between the plates has been particularly detrimental in the control of such clutches with the parts in such a position as to cause the clutch plates to be partially engaged or about to fully engage, and the present mechanism is particularly designed to provide smooth and uniform operation when the clutch parts are in this position.

With the parts in the position shown, it will be understood that the clutch plates are fully engaged under the action of the springs 8, and that the lever 11 is substantially free from any force tending to rotate it in either direction about the pivot pin 12, the piston member 19 being provided with a shoulder 41 adapted to rest against a similar shoulder 42 formed at the right end of the cylinder 16, and the member 28, connected to the push rod 30 resting against stops 43 formed on the right side of the piston member 19. Thus the spring 34 being under a predetermined tension, tends to force parts 27 and 28 apart, but undesirable distortion of the diaphragm due to this action is prevented by the engagement of the left side of the member 28 with the stops 43.

Assuming now that the operator is desirous of actuating the mechanism to disengage the clutch, the valve 37 is operated to supply a desired amount of fluid under pressure to the interior of the cylinder 16, this pressure acting on the piston 19 to force the latter to the right, this motion in turn being transmitted to the rod 30 through the medium of stops 43 and plate 28, with resultant clockwise movement of the lever 11 to disengage the clutch. In clutches of this type, however, considerable clockwise movement of the lever 11 is necessary before the force tending to hold the clutch plates together is sufficiently reduced to permit slipping to occur between the plates, and the tension of the spring 34 is accordingly so chosen as to prevent relative movement between the member 28 and the piston 19 until this point of operation is approached. As the pressure in the interior of the cylinder 16 is increased to this point, however, the pressure acting on the diaphragm 26 as conveyed thereto through the port 25 of the screw 21 and through the medium of chamber 24 exerts a force sufficient to overcome the tension of the spring 34 and to permit corresponding movement of the diaphragm and the attached parts to the right with respect to the piston with the resultant tendency to further actuate the push rod 30 to the right and to further reduce the pressure between the plates of the clutch. Since the diaphragm 26 and its associated parts inherently have a very small amount of friction of movement, in comparison with the friction between the piston cup 23 and the cylinder wall, it will be apparent that in the event the piston cup tends to stick or bind in the cylinder when the above described degree of fluid pressure is reached therein, the diaphragm will then take up the work of acting as a fluid motor to actuate the clutch lever 11, and in the event the force exerted on the rod 30 through the medium of the diaphragm 26 exceeds the combined air pressure force and friction force tending to prevent movement of the piston to the left, the piston will in this case, tend to move slightly to the left until a new position of equilibrium of the forces involved is reached. It will also be understood by those skilled in the art that during this type of operation of the fluid pressure device above described, the diaphragm alone may be effective to actuate the rod 30 through the distance shown between the right face of the plate 29 and the left face of the plate 27 even though the piston cup firmly adheres to the cylinder wall without slipping during this particular period of operation. If, on the other hand, the friction between the cup and the cylinder wall is overcome during this period of operation by an increase in the pressure of fluid in the cylinder, the piston body will move to the right while at the same time, relative movement of the diaphragm to the left with respect to the body may occur to establish a new condition of equilibrium of the parts.

It will be seen from the foregoing that the springs 8 normally oppose movement of the piston rod 30 to the right as well as movement of the piston itself, while the spring 34 opposes movement of the rod 30 to the right with respect to the piston 19, the tension of the spring 34 being carefully chosen with respect to the effective area of the diaphragm 26 as well as with respect to the forces which must be employed to actuate the clutch throwout mechanism. Different combinations of areas of the pressure responsive members and of tension of the springs used may be resorted to in order to provide for satisfactory operation of any device or clutch to be actuated.

While the invention has been illustrated and described herein with considerable particularity, it is to be understood that the same is not limited to the form shown, but may receive a variety of expressions as will readily appear to those skilled in the art. Reference will, therefore, be had to the appended claims for a definition of the limits of the invention.

What is claimed is:

1. The combination with a source of fluid pressure and a device to be actuated, of a fluid motor having a casing adapted to receive fluid under pressure from said source, a pressure responsive member movably mounted in said casing and responsive to the pressure therein, a second pressure responsive member of greater area carried by the first named pressure responsive member and subjected to the pressure in the casing, means for connecting one of said responsive members with the device to be actuated and preloaded resilient means interposed between said pressure responsive members for preventing relative movement therebetween when the pressure supplied to said fluid motor is less than a predetermined value.

2. The combination with a source of fluid pressure and a device to be actuated, of a fluid motor comprising a casing adapted to receive fluid under pressure from said source, a pressure responsive member mounted for movement in said casing and subjected to said fluid pressure, a second fluid pressure responsive member of greater area carried by said first named pressure responsive member and subjected to the pressure in said casing, means for connecting one of said pressure responsive members with the device to be actuated, and preloaded resilient means interposed between said pressure responsive members for preventing movement of said second named pressure responsive member relative to said first named pressure responsive member until the pressure in the casing exceeds a predetermined value.

3. The combination with a source of fluid pressure and a device to be actuated, of a fluid motor having a casing adapted to receive fluid under pressure from said source, a piston mounted in said casing and subjected to the pressure therein, a pressure responsive member carried by said piston having a greater area and subjected to the pressure in said casing, means for connecting said pressure responsive member with the device to be actuated, and means including a preloaded spring interposed between said piston and pressure responsive member for preventing movement of said pressure responsive member relative to said piston until the pressure in said casing exceeds a predetermined value.

4. The combination with a source of fluid pressure and a device to be actuated, of a fluid motor comprising a cylinder adapted to receive fluid under pressure from said source, a hollow piston slidably mounted in said cylinder, a pressure responsive member carried by said piston having a greater area and closing one end thereof, means for connecting said pressure responsive member with the device to be actuated, means for conducting fluid pressure between the cylinder and the interior of said hollow piston and preloaded resilient means interposed between said piston and pressure responsive member for preventing relative movement therebetween when the pressure supplied to said fluid motor is less than a predetermined value.

5. The combination with a source of fluid pressure and a device to be actuated, of a fluid motor for actuating said device including a cylinder adapted to receive fluid under pressure from said source, a piston slidably mounted in said cylinder and subjected to the pressure of said fluid, a bore formed in said piston, means for establishing a connection for fluid pressure between said cylinder and bore, means for closing the end of said bore including a pressure responsive member carried by said piston having a greater area and subjected to the pressure of fluid in said bore, means for connecting said pressure responsive member with the device to be actuated, and preloaded resilient means interposed between said pressure responsive member and piston for preventing movement of said pressure responsive member with respect to said piston until the pressure in said bore exceeds a predetermined value.

6. The combination with a source of fluid pressure and a device to be actuated, of a fluid motor for actuating said device including a cylinder adapted to receive fluid under pressure from said source, a piston slidably mounted in said cylinder and subjected to the pressure therein, a pressure responsive member carried by said piston having a greater area and subjected to the pressure in said cylinder, means for effecting an operative connection between the pressure responsive member and the device to be actuated, resilient means for opposing the movement of said connecting means for actuating said device, and preloaded resilient means carried by said piston for opposing movement of said pressure responsive member relative thereto.

7. A combination with a source of fluid pressure and a device to be actuated, of a fluid motor for actuating said device including a cylinder adapted to receive fluid under pressure from said source, a pressure responsive member movably mounted in said cylinder and subjected to the pressure of fluid therein, a second pressure responsive member of greater area carried by said first named pressure responsive member and subjected to the pressure of fluid in said cylinder, means for effecting an operative connection between one of said pressure responsive members and said device, and preloaded resilient means for opposing movement of said first and second named pressure responsive means.

8. The combination with a source of fluid pressure and a device to be actuated, of a casing adapted to receive fluid under pressure from said source, a pressure responsive member mounted in said casing for movement with respect thereto and subjected to the pressure of fluid therein, a second pressure responsive member of greater area carried by said first named pressure responsive member, mounted for movement with respect thereto, and subjected to the pressure in said casing, means for connecting one of said pressure responsive members with the device to be actuated, and preloaded resilient means for opposing relative movement of said pressure responsive members in one direction.

9. The combination with a source of fluid pressure and a device to be actuated, of a cylinder adapted to receive fluid under pressure from said source, a piston slidably mounted in said cylinder and subjected to the pressure therein, a chamber formed in said piston and adapted to receive fluid under pressure from said cylinder, a diaphragm mounted in said chamber and subjected to the pressure therein, means for connecting said diaphragm with the device to be actuated, and resilient means interposed between the piston and diaphragm for opposing relative movement therebetween in one direction.

10. The combination with a source of fluid pressure and a device to be actuated, of a casing adapted to receive fluid under pressure from said source, a pressure responsive member movably mounted therein and subjected to the pressure therein, a second pressure responsive member carried by and movably mounted with respect to said first named pressure responsive member and subjected to the pressure of fluid in said casing, said second named pressure responsive member having an area larger than that of said first named pressure responsive member, means for connecting one of said pressure responsive members directly with the device to be actuated, and resilient means associated with said pressure responsive members for opposing relative movement of said members.

11. The combination with a source of fluid pressure and a device to be actuated, of a fluid motor for actuating said device including a casing adapted to receive fluid pressure from the source, a pressure responsive member mounted in the casing and subjected to the pressure therein and means for connecting said pressure responsive member with the device, a fluid actuator for bodily moving said fluid motor including a pressure responsive member of greater area than said first named pressure responsive member subjected at all times to the same pressure from the source as the first named pressure responsive member and means including a preloaded resilient element interposed between the casing and pressure responsive member of the fluid motor for preventing actuation of the device thereby when the pressure supplied to the fluid motor is less than a predetermined value.

WILLIAM J. ANDRES.
ROY S. SANFORD.